United States Patent
Moreau

(10) Patent No.: US 7,644,681 B2
(45) Date of Patent: Jan. 12, 2010

(54) EXIT GATE WITH COW PUSH BAR FOR MILKING PARLOR

(75) Inventor: Joseph R. Moreau, Clinton, NY (US)

(73) Assignee: Norbco, Inc., Westmoreland, NY (US)

( * ) Notice: Subject to any disclaimer, the term of this patent is extended or adjusted under 35 U.S.C. 154(b) by 313 days.

(21) Appl. No.: 11/704,567

(22) Filed: Feb. 9, 2007

(65) Prior Publication Data

US 2007/0186859 A1    Aug. 16, 2007

Related U.S. Application Data

(60) Provisional application No. 60/773,275, filed on Feb. 14, 2006.

(51) Int. Cl.
*A01K 1/00* (2006.01)
(52) U.S. Cl. .................... 119/14.03; 119/524
(58) Field of Classification Search ............... 119/524, 119/516, 520, 14.03, 14.01, 518, 517, 703, 119/843, 735, 736, 722
See application file for complete search history.

(56) References Cited

U.S. PATENT DOCUMENTS

| 1,512,610 | A | * | 10/1924 | Kolb | 119/517 |
| 2,904,005 | A | * | 9/1959 | Mielke et al. | 119/520 |
| 4,617,876 | A | * | 10/1986 | Hayes | 119/842 |
| 4,763,605 | A | * | 8/1988 | Braum | 119/14.03 |
| 5,203,280 | A | | 4/1993 | Nelson | 119/14.03 |
| 5,230,299 | A | * | 7/1993 | Moreau | 119/14.03 |
| 5,259,335 | A | * | 11/1993 | Moreau | 119/14.03 |
| 5,285,746 | A | * | 2/1994 | Moreau | 119/14.03 |
| 5,615,637 | A | | 4/1997 | Nelson | 119/514.03 |
| 5,638,768 | A | * | 6/1997 | Moreau | 119/14.03 |
| 6,386,147 | B1 | * | 5/2002 | Fransen | 119/524 |
| 6,394,027 | B2 | * | 5/2002 | Gallagher et al. | 119/14.03 |

FOREIGN PATENT DOCUMENTS

EP    635206 A1 *  1/1995

OTHER PUBLICATIONS

Lubricant Aerosols; Oct. 21, 2002; retrived from internet: Feb. 5, 2009; http://web.archive.org/web/20021021170607/www.mrosolutions.com/piaerlub.htm.*

* cited by examiner

*Primary Examiner*—Rob Swiatek
*Assistant Examiner*—Kristen C Hayes
(74) *Attorney, Agent, or Firm*—Bernhard P. Molldrem, Jr.

(57) ABSTRACT

A push bar serves to nudge or urge cows to leave a milking parlor and move to an exit alley. The push bar is mounted on extendible support members, which may have an inner tube and an outer tube, and which is mounted by a journal onto an overhead pivot. There is one air cylinder to rotate the assembly, and additional air cylinders to extend and retract the support members. A programmed controller ensures that the push tube travels in a generally straight, horizontal path to push the cows out, and then lifts the push tube so it is over the cows' heads on the return.

10 Claims, 5 Drawing Sheets

US 7,644,681 B2

EXIT GATE WITH COW PUSH BAR FOR MILKING PARLOR

Applicant claims priority under 35 U.S.C. 119(e) of Provisional Appln. No. 60/773,275, filed Feb. 14, 2006.

BACKGROUND OF THE INVENTION

This invention relates in general to cattle stalls, e.g., milking parlors, and is more particularly directed to a technique for releasing cows from a diagonal, herringbone, parabone, or parallel type milking parlor. The invention is more particularly concerned with a push bar that lowers behind the cows, and sweeps forward to urge the cows from the cow stalls after the exit gate or front brisket board moves or lifts away to permit the cows to exit the parlor after milking.

A milking parlor generally consists of an array of individual stalls, each being designed to hold a single cow as she is being milked. The cows are walked into the parlor through an entry gate, and then each cow is directed to her respective stall. There an attendant washes her udders, attaches a milking unit, monitors and attends to the milking operation, disconnects the milking unit, and releases the cows so another group of cows can be milked. In parlors of this type, the cows proceed in single file through the entry gate into the parlor. After the cows have been milked and the milking units removed, an exit gate lifts open at the forward or head side, and the cows exit under this to move to an exit lane. This system is employed in various schemes for milking parlors, including herringbone, diagonal, and parallel or side-by-side, and in hybrid systems such as so-called parabone systems. A parallel milking parlor operation is described in my earlier U.S. Pat. Nos. 5,230,299; 5,285,746; and 5,638,768, which are incorporated herein by reference. An example of brisket bar apparatus for aligning cows in both a herringbone and a diagonal parlor, and for releasing them after milking, is described in Reisgies et al. U.S. Pat. No. 4,951,608.

Sequencing gates, which are required in parallel or side-by-side parlors, are omitted in the diagonal parlor. This simplifies installation, and also aids in cow entry, as it creates a wider lane for the cows.

It frequently occurs that a cow will resist leaving the milking parlor after the milking operation. When this happens, the operator has to take some step to push against her hind end to urge her to move forward. This consumes time from the milking operation, and limits the number of cows that can be milked per hour.

Previously, milking parlors have been proposed with a rotary mechanism that swings down behind the cows when the exit gate opens to push them out of the milking parlor stalls. Each of these uses a pair of brisket bar elements that are mounted on an overhead horizontal axis, and rotate 180 degrees. The upper bar swings down to push out the cows, and becomes the brisket rail for the next group of cows. A version of this in connection with a diagonal or herringbone parlor is discussed in Nelson U.S. Pat. No. 5,203,280 and in connection with a parallel parlor in Nelson U.S. Pat. No. 5,615,637.

In each of these rotary exit gate schemes, the bar is at a fixed radius from the pivot axis. This means that the bar can only travel in an arcuate rotary path, so when the bar moves, it tends to drop down against the cow's back unless she has already started to move forward. In the case of the parallel parlor system, the rotary path of the bar has to be positioned forward of the exit gates, and the bar can strike against the shoulder or neck if the cow has not started forward. In addition, because the rotary exit gate system must have a 360 degree sweep, there has to be a considerable allowance for clearance overhead.

OBJECTS AND SUMMARY OF THE INVENTION

Accordingly, it is an object of this invention to provide a combination of exit gate and cow pusher bar for a parallel, herringbone, diagonal or similar milking parlor which overcomes the drawbacks of the prior art.

It is another object to provide a pusher bar that can descend behind the rump or hind quarter of the cow and gently urge her forward from the stall without risk of striking her back or shoulders.

It is a further object to provide a pusher bar system, for a parallel type parlor, that can be programmed to push behind the cow and then to lift above the position of sequencing gates.

In accordance with an aspect of the present invention, there is a front exit gate, e.g., front release position. In addition, there is a cow pusher bar that is normally positioned in a lifted position above the cows, and then when the front exit gate has been raised or opened, the bar descends, and then moves forward to urge the cows out of the stalls. Preferably, the bar is mounted on an extending tube arrangement, in which an outer tube is journaled on an overhead pivot bar, and the pusher bar is supported at the lower end of an inner tube that slides in and out of the outer tube. An air cylinder (or equivalent linear device) is mounted next to the outer tube and has a rod coupled to a mount at the end of the inner tube where the push bar is supported. Another air cylinder (or equivalent) rotates a lever arm at the upper end of the outer tube to rotate the outer tube, and with it the inner tube and push bar, so that the push bar sweeps forward to gently urge the cows out of the stalls. This construction minimizes the overhead space required. Also, this arrangement causes the push bar to reach down behind the cow's rump so she is pushed forward from that body portion, and is not struck from above on her back, shoulders, or head. A programmable controller controls the air flow to each of the various cylinders. This provides a means for the timing of the actuation of the various air cylinders to be adjusted so as to control the sweep path of the push bar. The timing can be done in various ways, such as different air pressures, stroke sensors, or using a programmable logic controller. The path can be designed to push behind the cow and then lift over the position of the sequencing gates, in the case of a parallel parlor. The air pressure can be controlled so that the force against the cow is limited to a gentle push.

In the described embodiment, the outer tube is positioned above, and journaled to the pivot bar, while the inner tube is positioned below and is connected with the push bar. Of course, a different configuration could be used, if desired, with the inner tube positioned above and journaled to the pivot bar and the outer tube positioned below and sliding out over the inner tube and supporting the push bar. Also, the actuator or cylinder could be positioned elsewhere than where it is shown in the preferred embodiment, and could be a hydraulic actuator, cable driven system, or linear electric motor driven system, as appropriate.

In some preferred embodiments, a rail assembly swings up to release the cows after milking. In other cases, individual exit gates may be used, or a vertical lift brisket bar can be used as the exit gate. The above and many other objects, features, and advantages of this invention will become apparent from the ensuing detailed description of a preferred embodiment, which should be read in connection with the accompanying Drawing.

DETAILED DESCRIPTION OF THE PREFERRED EMBODIMENT

Figure 1:
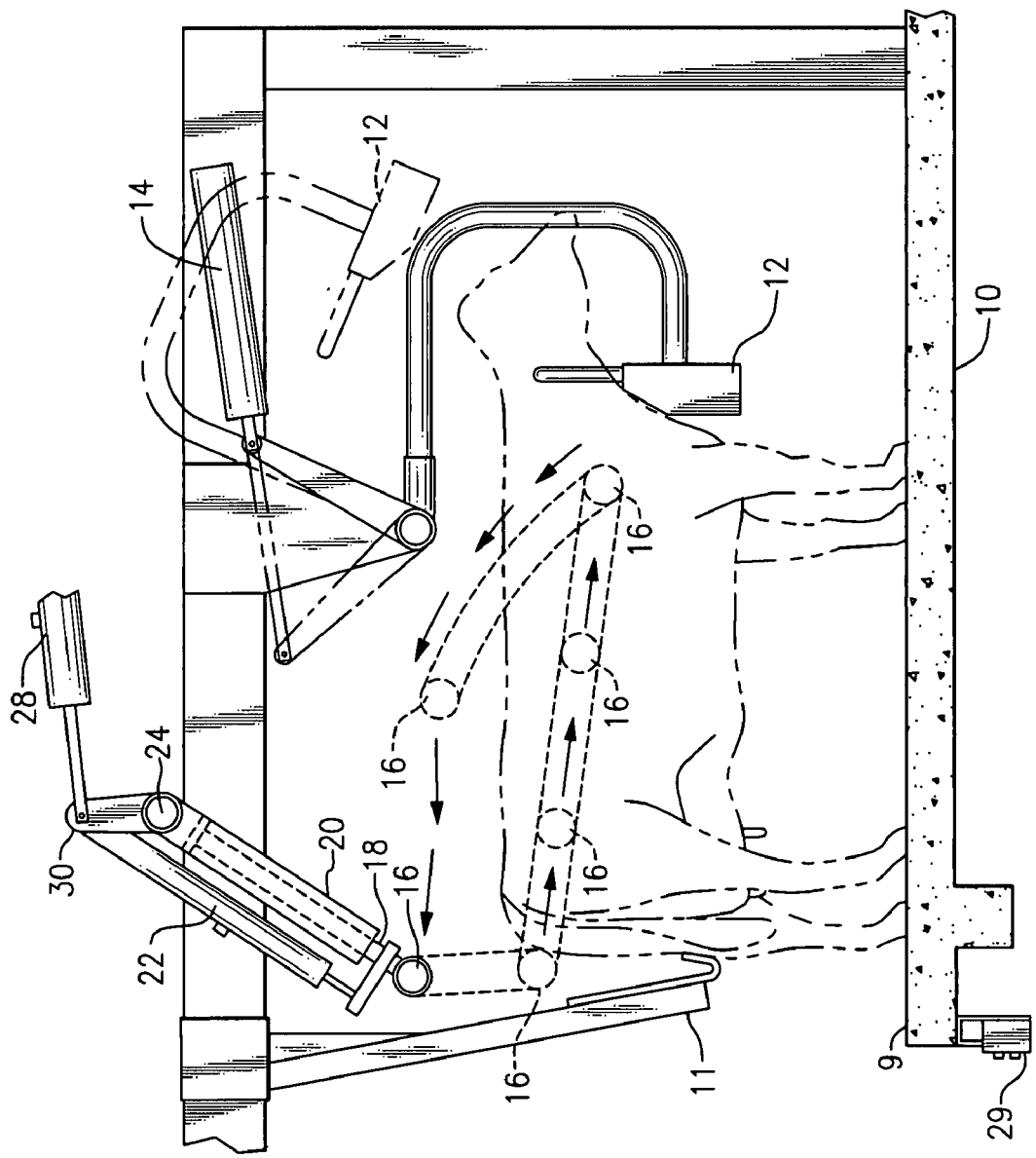
FIG. 1 shows a diagonal milking parlor which includes a front exit gate and rear pusher bar according to an embodiment of this invention.

With reference now to the Drawing, and initially to FIG. 1, a milking parlor (only a portion of which is illustrated) includes a cow stand or platform 10 that is formed of poured concrete, with a curb at one edge, here shown at the left, adjacent a milking pit, which is the work station for the milker or operator. Vertical metal beams or standards rise from the platform and support overhead support bars. A rump rail or splash shield 11 traverses the parlor above the curb, and defines the back of the cow positions on the platform, i.e., with the cows standing with their rumps, i.e. rear or hind ends against the splash shield 11.

A swing-up front rail assembly 12 is disposed distally, i.e., to the right in this Drawing Figure, to define the front of the cow positions. Support members are suspended from the overhead support bars and these support an overhead transverse pivot bar. An air cylinder 14 is also fitted to the overhead support bars, and has its rod coupled to a swing arm for rotating the front rail assembly 12. With the cylinder in the withdrawn position, as shown in solid lines, the front positioning rail assembly 12 is in its descended or milking position. In this position, the rail restrains the cows so that they can be milked. When the cylinder 14 is actuated to extend its rod, as shown in ghost, the positioning rail assembly 14 is raised to a release position, so that after milking the cows can leave their stalls 10 rail assembly 12 and proceed out of the parlor. The front positioning rail assembly 12 is then lowered again before the next group of cows enters the parlor. A cow is shown in ghost lines to illustrate the position of the cow for milking.

As shown to the left in FIG. 1, a horizontal pusher bar 16 (here shown end-on) is provided here as a pipe or tube, and is supported on an extendable assembly formed of an inner tube 18 on which the pusher bar is supported, and an outer tube 20 in which the inner tube slides in and out. An air cylinder 22 is supported alongside the outer tube 20, and has a rod that extends to push the inner tube 18 out and withdraws to slide the inner tube 18 back in. The upper end of the outer tube 20 is journaled onto an overhead horizontal pivot bar 24. A lever arm 24 is connected with the rod of another air cylinder 28 to rotate the outer tube 20, and with it the inner tube 18 and push bar 16, to sweep the push bar.

As illustrated here in broken lines, when the rail assembly 12 is lifted to the open or release position, the push bar 16 is first extended downward, and then is gently swept forward. Then at the end of its cycle, the push bar 16 is withdrawn upward, and then brought back to the starting position. This is accomplished by first actuating the cylinder 22 to extend the inner tube 18, and then actuating the other cylinder 28 to swing the outer tube 20 distally and sweep the push bar 16 forward. Thereafter, the cylinders 22 and 28 are actuated in the opposite sense to return the push bar as shown. Then the front rail assembly descends, and the milking parlor is ready to receive the next group of cows. A control box 29 can be positioned in the milking pit or alley next to the cow stand. This control box 29 contains a programmable control mechanism for controlling the air going to the cylinders 14, 22, 28, so that the push bar 16 travels forward in a generally straight, and more-or-less horizontal line path to urge the cows out of the stall, and then is raised so it is above the cows' heads as it travels back along its return path.

Figure 2:
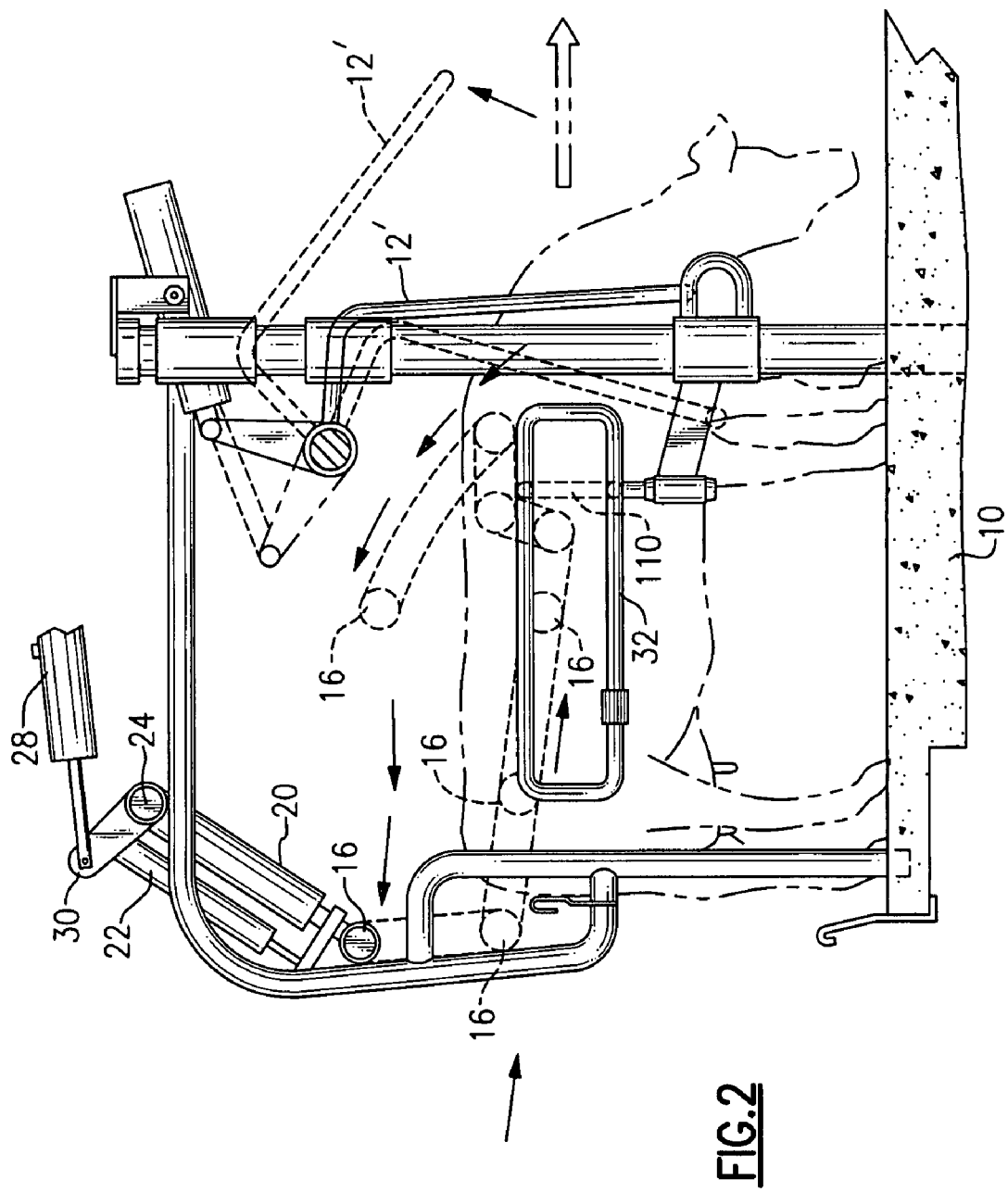
FIG. 2 shows a parallel or side-by-side milking with front exit gate(s) and rear pusher bar(s) according to an embodiment.

FIG. 2 shows another embodiment where the same elements as described above are identified with the same reference numbers. This embodiment comprises a parallel or side-by-side milking parlor arrangement. Here, an individual self-indexing front lift gate 12' is provided for each stall. Sequencing gates 32 rotate to the open position (solid lines) when the cows enter the parlor, and rotate back to the closed position (dash lines) when the cows exit. These sequencing gates 32 are discussed in my earlier U.S. Pat. No. 5,259,335. The cylinders 22, 28 include position sensors, which provide position information to the control circuit within the control box 29 that controls the air that is supplied to the cylinders.

In this embodiment, the push bar assembly operates to extend out behind the rump or hind end of the cow, and then sweep forward as shown. The pathway of the push bar 16 is programmed so that the push bar lifts above the position of the sequencing gates, and then can continue forward to continue to urge the cow out. Thereafter, the push bar is returned back to the position shown in solid line.

Figure 3:
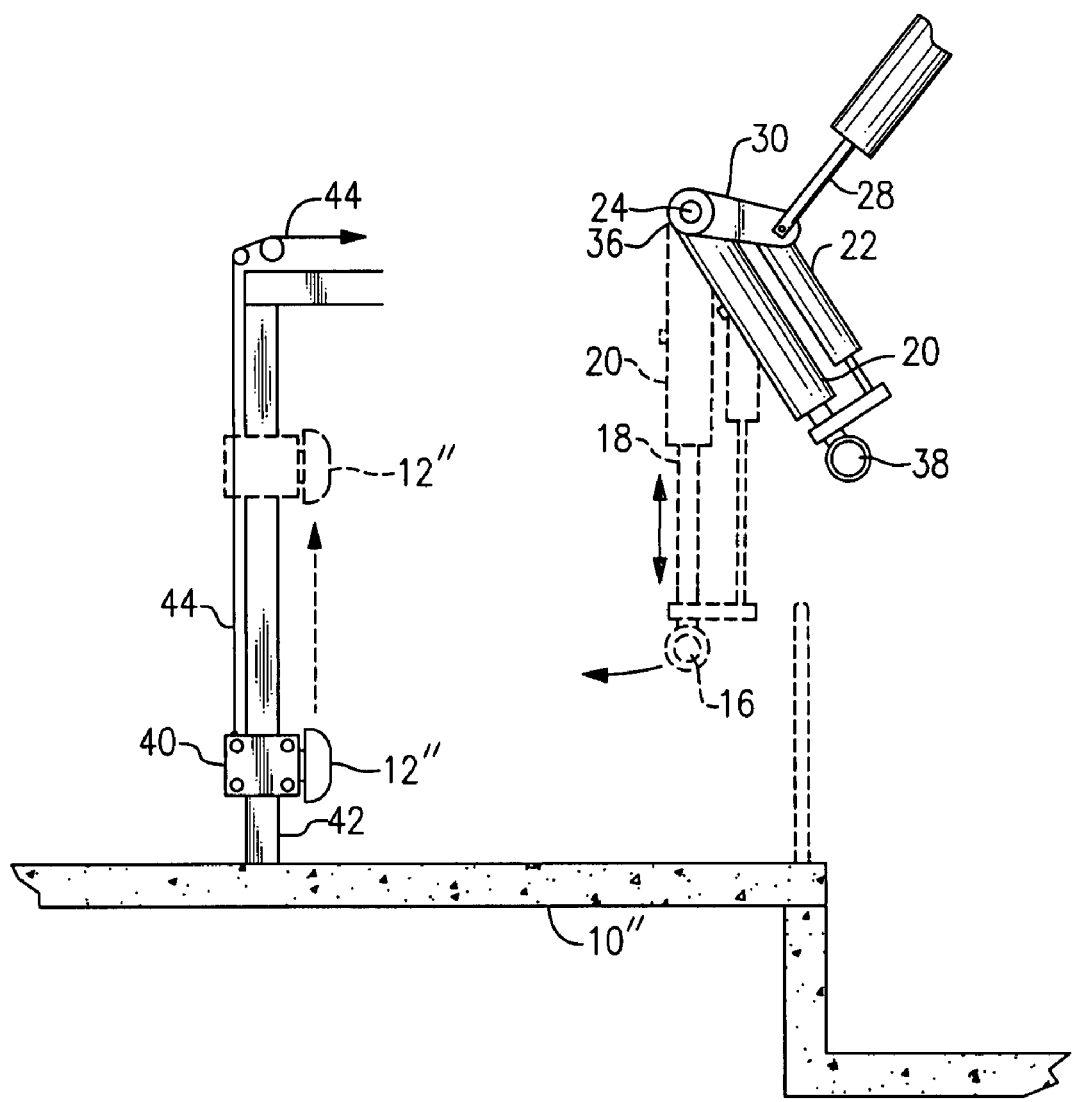
FIG. 3 is a side view of yet another type of milking parlor including a rear pusher bar assembly according to an embodiment of the invention.

Another possible embodiment is shown in FIG. 3, in which a brisket bar 12" is configured as a vertical lift exit gate. The brisket bar 12" is mounted on a roller-based carriage 40, with rollers that ride on a vertical post 42. Here a cable 44 forms part of the lift system to lift the carriage 40 and brisket bar 12" to the open position (shown in broken line). The power mechanism, which can be pneumatic, hydraulic, or electric-motor based, is not shown here.

To the right is shown the push bar mechanism. Here, the outer tube 20 has a journal member 36 (e.g., a lubricated plastic sleeve) at its upper end to facilitate rotation on the pivot bar 24. There is a lower tubular mount 38 at the lower end of the inner tube 18, and the push bar or push tube 16 fits loosely in the tubular mount(s). This provides enough play so that the tubes 18, 20 do not bind in one another when the mechanism is extended and rotated.

Figure 4:
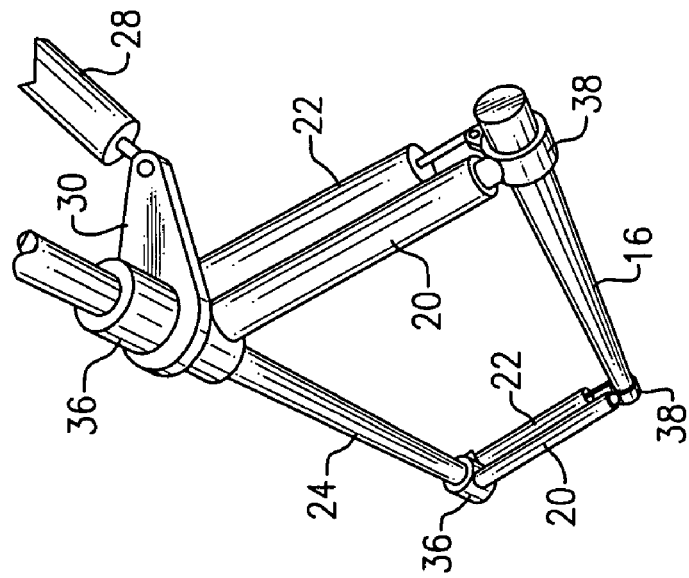
FIGS. 4 and 5 are perspective views of the pusher bar assembly of these embodiments, in withdrawn and extended positions.
Figure 5:
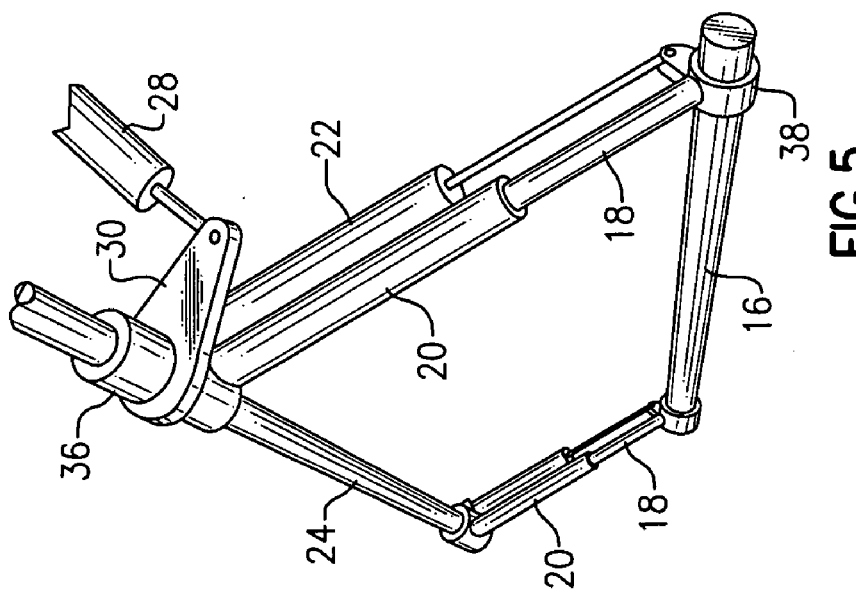
Figure 6:
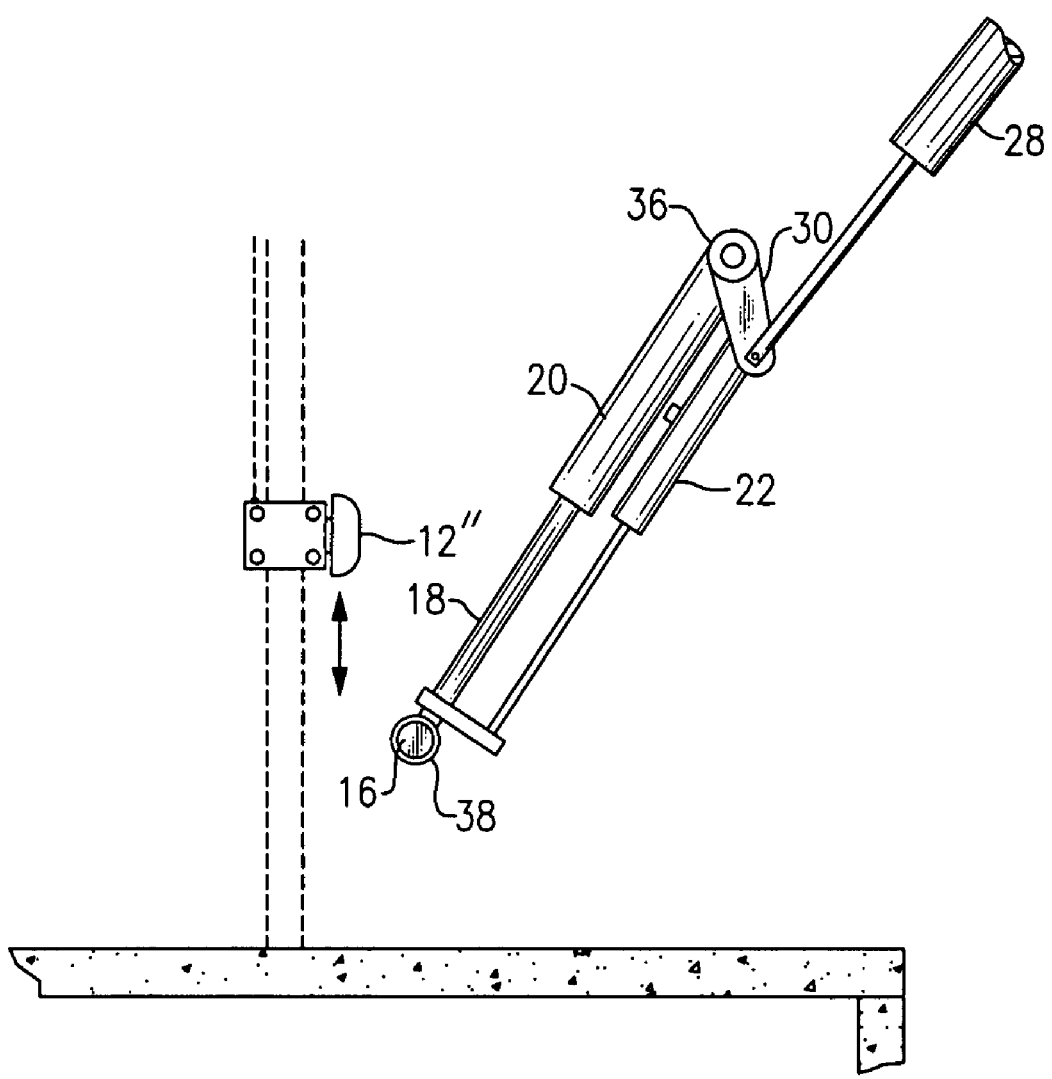
FIG. 6 is a side view showing the pusher bar assembly in an extended and swept forward position.

FIGS. 4, 5, and 6 show the inner tubes 18 and push bar 16 in the fully withdrawn position (FIG. 4), extended position (FIG. 5), and fully rotated or swept forward position (FIG. 6). As shown also in the perspective views of FIGS. 4 and 5, the push bar 16 is provided with a combination of inner tube 18, outer tube 20, and air cylinder 22 at each end.

The invention has been described herein with reference to a some selected preferred embodiments, but the invention is not limited to that those embodiments. Rather, many modifications and variations will become apparent to persons skilled in the art without departing from the scope and spirit of this invention, as defined in the appended claims.

I claim:

1. An extendible and rotatable push bar assembly for gently urging cows out from a milking parlor after the end of a milking operation; comprising:
   a horizontal push bar;
   an overhead horizontal pivot member;
   a plurality of extender slide assemblies, each having an upper slide member with a journal member that is pivotally journaled on said overhead horizontal pivot member and a lower slide member movable in said upper slide member, and supporting a respective end of said horizontal push bar such that the horizontal push bar moves radially in respect to said overhead horizontal pivot member; and each said slide assembly including a linear actuator that extends the lower and upper slide members relative to one another for controllably extending the push bar radially outward in respect to said pivot member; and
   means independent of said linear actuator for controllably rotating the upper slide members about said pivot member to sweep the push bar controllably forward to urge the cows out of the milking parlor.

2. The push bar assembly of claim 1 wherein said extender slide assemblies each include an outer tube journaled to said overhead horizontal pivot member and an inner tube slidable in said outer tube and having a support at its lower end in which said push bar is supported.

3. The push bar assembly of claim 2 wherein said support at the lower end of the lower tube fits said push bar loosely to provide sufficient play so that the lower and upper tubes do not bind when the extender slide members are extended and retracted.

4. The push bar assembly of claim 1 wherein said push bar includes a push tube.

5. The push bar assembly of claim 1 wherein said means for rotating includes a pivot arm extending from said journal member and a linear actuator connected to a free end of said pivot arm.

6. The push bar assembly of claim 1 wherein said journal member includes a lubricated plastic sleeve.

7. The push bar assembly of claim 1 comprising a programmable control mechanism for controlling linear actuation of the extender slide members and the means for controllably rotating the upper slide members, such that the push bar travels in a straight and generally horizontal path to urge the cows out of the milking parlor.

8. The push bar assembly of claim 7 wherein said control mechanism controls said linear actuators and the means for controlling rotation such that the push bar is withdrawn radially towards said pivot member and is raised above said horizontal path to travel on an elevated return path.

9. The push bar assembly of claim 7 wherein said milking parlor defines cow milking positions in which cows stand with their hind ends at a hind end position, and said means for rotating the upper members is adapted to move said push bar from a position behind said hind end position to a position in advance of said hind end position to urge the cows out of the milking parlor.

10. The push bar assembly of claim 1 wherein said milking parlor defines cow milking positions in which cows stand with their hind ends at a hind end position, and said means for rotating the upper members is adapted to move said push bar from a position behind said hind end position to a position in advance of said hind end position to urge the cows out of the milking parlor.

* * * * *